(12) United States Patent
Gross et al.

(10) Patent No.: US 10,550,218 B2
(45) Date of Patent: Feb. 4, 2020

(54) TRANSPARENT ANTI-ICING COATINGS

(71) Applicant: HRL Laboratories, LLC, Malibu, CA (US)

(72) Inventors: Adam F. Gross, Santa Monica, CA (US); Andrew P. Nowak, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/718,181

(22) Filed: Sep. 28, 2017

(65) Prior Publication Data
US 2018/0016383 A1 Jan. 18, 2018

Related U.S. Application Data

(63) Continuation-in-part of application No. 14/535,374, filed on Nov. 7, 2014, now Pat. No. 9,845,418.
(Continued)

(51) Int. Cl.
*C09K 3/18* (2006.01)
*C09D 5/00* (2006.01)
(Continued)

(52) U.S. Cl.
CPC ....... *C08G 18/5015* (2013.01); *C08G 18/792* (2013.01); *C09D 5/00* (2013.01);
(Continued)

(58) Field of Classification Search
None
See application file for complete search history.

(56) References Cited

U.S. PATENT DOCUMENTS 5,695,608 A * 12/1997 Yagi ................. D21H 19/40
162/135
6,071,336 A 6/2000 Fairchild et al.
(Continued)

FOREIGN PATENT DOCUMENTS

WO 2012003004 A2 1/2012

OTHER PUBLICATIONS

Cao et al., "Anti-icing superhydrophobic coatings," Langmuir (2009), DOI: 10.1021/la902882b.
(Continued)

*Primary Examiner* — David Sample
*Assistant Examiner* — Nicole T Gugliotta
(74) *Attorney, Agent, or Firm* — O'Connor & Company

(57) ABSTRACT

Transparent, impact-resistant, anti-icing coatings are disclosed. In some variations, a transparent anti-icing coating comprises: a continuous matrix of a hardened material; asymmetric templates that inhibit wetting of water, wherein the asymmetric templates have a length scale from about 10-300 nanometers; porous voids surrounding the asymmetric templates, wherein the porous voids have a length scale from about 15-500 nanometers; and nanoparticles that inhibit heterogeneous nucleation of water, wherein the nanoparticles have an average size from about 5-50 nanometers. Disclosed coatings have transparencies of 90% or higher light transmission. These coatings utilize lightweight and environmentally benign materials that can be rapidly formed into coatings. A uniform distribution of particles and asymmetric templates throughout the coating allows it to be abraded, yet retain its anti-icing function as well as transparency. Therefore if the surface is damaged during use, freshly exposed surface is identical to that which was removed, for extended lifetime.

13 Claims, 9 Drawing Sheets

Related U.S. Application Data

(60) Provisional application No. 61/901,769, filed on Nov. 8, 2013.

(51) Int. Cl.
    *C08K 13/04* (2006.01)
    *C09D 7/40* (2018.01)
    *C08G 18/50* (2006.01)
    *C08G 18/79* (2006.01)
    *C09D 175/04* (2006.01)
    *C09D 175/08* (2006.01)
    *C08K 9/06* (2006.01)

(52) U.S. Cl.
    CPC ......... *C09D 175/04* (2013.01); *C09D 175/08* (2013.01); *C09K 3/18* (2013.01); *C08K 9/06* (2013.01)

(56) References Cited

U.S. PATENT DOCUMENTS

| | | | |
|---|---|---|---|
| 6,495,624 | B1 | 12/2002 | Brown |
| 7,150,904 | B2 | 12/2006 | D'Urso et al. |
| 7,258,731 | B2 | 8/2007 | D'Urso et al. |
| 7,419,615 | B2 | 9/2008 | Strauss |
| 7,754,279 | B2 | 7/2010 | Simpson et al. |
| 8,187,707 | B2 * | 5/2012 | Van Benthem .......... B05D 5/08 427/372.2 |
| 8,377,390 | B1 | 2/2013 | Brueck et al. |
| 2007/0298216 | A1 * | 12/2007 | Jing ........................ B05D 5/08 428/141 |
| 2010/0021745 | A1 | 1/2010 | Simpson et al. |
| 2010/0304086 | A1 | 12/2010 | Carre et al. |
| 2010/0314575 | A1 | 12/2010 | Gao et al. |
| 2012/0064294 | A1 | 3/2012 | Enzerink et al. |
| 2015/0044420 | A1 | 2/2015 | Nowak et al. |

OTHER PUBLICATIONS

Conrad et al., "Ice nucleation on BaF2(111)," The Journal of Chemical Physics 122, 064709 (2005).

Deng et al., "Candle Soot as a Template for a Transparent Robust Superamphiphobic Coating," www.sciencexpress.org / Dec. 1, 2011 / 10.1126/science.1207115.

Guo et al., "Icephobic/Anti-Icing Properties of Micro/Nanostructured Surfaces," Adv. Mater. 2012, 24, 2642-2648.

Jung et al., "Mechanism of supercooled droplet freezing on surfaces," Nature Communications 3:615 (2012), DOI: 10.1038/ncomms1630.

Kim et al., "Liquid-Infused Nanostructured Surfaces with Extreme Anti-Ice and Anti-Frost Performance," ACS Nano, DOI: 10.1021/nn302310q • Publication Date (Web): Jun. 10, 2012.

Lai et al., "Markedly Controllable Adhesion of Superhydrophobic Spongelike Nanostructure TiO2 Films," Langmuir 2008, 24, 3867-3873.

Wang et al., "Self-Assembled Biomimetic Superhydrophobic CaCO3 Coating Inspired from Fouling Mineralization in Geothermal Water," Langmuir 2011, 27, 12275-12279, dx.doi.org/10.1021/la202613r.

Xu et al., "Transparent, Superhydrophobic Surfaces from One-Step Spin Coating of Hydrophobic Nanoparticles," ACS Appl. Mater. Interfaces (2012), dx.doi.org/10.1021/am201750h.

Zhai et al., "Stable Superhydrophobic Coatings from Polyelectrolyte Multilayers," Nano Lett., vol. 4, No. 7, 2004.

Zhang et al., "A facile method to prepare superhydrophobic coatings by calcium carbonate," Ind. Eng. Chem. Res. 2011, 50, 3089-3094.

Varanasi et al., "Frost formation and ice adhesion on superhydrophobic surfaces," Applied Physics Letters 97, 234102, 2010.

Riggs et al., "Creating Optically Transparent, Durable Superhydrophobic Thin Film Coatings," undated.

Aytug et al., "Nano-textured, Optically Transparent, Durable Superhydrophobic Thin Film Coatings" undated presentation.

Lee et al., "Zwitter-wettability and antifogging coatings with frost resistant capabilities" ACS Nano 2013, vol. 7, No. 3, 2172-2185.

Arkles, Barry, "Hydrophobicity, Hydrophilicity and Silanes" Oct. 2006 issue of Paint & Coatings Industry magazine.

* cited by examiner

TRANSPARENT ANTI-ICING COATINGS

PRIORITY DATA

This patent application is a continuation of U.S. patent application Ser. No. 14/535,374, filed Nov. 7, 2014 (now allowed), which claims priority to U.S. Provisional Patent App. No. 61/901,769, filed Nov. 8, 2013, each of which is hereby incorporated by reference herein.

FIELD OF THE INVENTION

The present invention generally relates to transparent, abrasion-resistant anti-icing coatings for various commercial applications.

BACKGROUND OF THE INVENTION

Ice-repellent coatings can have significant impact on improving safety in many infrastructure, transportation, and cooling systems. Among numerous problems caused by icing, many are due to striking of supercooled water droplets onto a solid surface. Such icing caused by supercooled water, also known as freezing rain, atmospheric icing, or impact ice, is notorious for glazing roadways, breaking tree limbs and power lines, and stalling airfoil of aircrafts.

When supercooled water impacts surfaces, icing may occur through a heterogeneous nucleation process at the contact between water and the particles exposed on the surfaces. Icing of supercooled water on surfaces is a complex phenomenon, and it may also depend on ice adhesion, hydrodynamic conditions, the structure of the water film on the surface, and the surface energy of the surface (how well the water wets it). The mechanism of heterogeneous ice nucleation on inorganic substrates is not well understood.

Melting-point-depression fluids are well-known as a single-use approach that must be applied either just before or after icing occurs. These fluids (e.g., ethylene or propylene glycol) naturally dissipate under typical conditions of intended use (e.g. aircraft wings, roads, and windshields). These fluids do not provide extended (e.g., longer than about one hour) deicing or anti-icing. Similarly, sprayed Teflon® or fluorocarbon particles affect wetting but are removed by wiping the surface. These materials are not durable.

Chemical character of a surface is one determining factor in the hydrophobicity or contact angle that the surfaces demonstrate when exposed to water. For a smooth untextured surface, the maximum theoretical contact angle or degree of hydrophobicity possible is about 120°. Surfaces such a polytetrafluoroethylene or polydimethylsiloxane are examples of common materials that approach such contact angles.

Recent efforts for developing anti-icing or ice-phobic surfaces have been mostly devoted to utilize lotus leaf-inspired superhydrophobic surfaces. These surfaces fail in high humidity conditions, however, due to water condensation and frost formation, and even lead to increased ice adhesion due to a large surface area.

Many investigators have produced high-contact-angle surfaces through combinations of hydrophobic surface features combined with roughness or surface texture. One common method is to apply lithographic techniques to form regular features on a surface. This typically involves the creation of a series of pillars or posts that force the droplet to interact with a large area fraction of air-water interface. However, surface features such as these are not easily scalable due to the lithographic techniques used to fabricate them. Also, such surface features are susceptible to impact or abrasion during normal use. They are single layers, which contributes to the susceptibility to abrasion.

Other investigators have produced coatings capable of freezing-point depression of water. This typically involves the use of small particles which are known to reduce freezing point. Single-layer nanoparticle coatings have been employed, but the coatings are not abrasion-resistant. Many of these coatings can actually be removed by simply wiping the surface, or through other impacts. Others have introduced melting depressants (salts or glycols) that leech out of surfaces. Once the leeching is done, the coatings do not work as anti-icing surfaces.

Nanoparticle-polymer composite coatings can provide melting-point depression and enable anti-icing, but they do not generally resist wetting of water on the surface. When water is not repelled from the surface, ice layers can still form that are difficult to remove. Even when there is some surface roughness initially, following abrasion the nanoparticles will no longer be present and the coatings will not function effectively as anti-icing surfaces.

In some applications, transparent coatings are very important. For example, transparency in functional coatings is desirable for residential and vehicle windows, optical lenses, filters, instruments, sensors, eyeglasses, cameras, satellites, weapon systems, and photovoltaic glass.

Yet, there are fundamental limitations prohibiting visual transparency. Integrating hydrophobicity and transparency within the same surface presents significant challenges. Hydrophobicity typically competes with transparency because the surface features (i.e., surface roughness) associated with hydrophobicity typically scatter light, making surfaces appear opaque or translucent. Additionally, surfaces with large roughness usually exhibit weak mechanical stability.

For example, polymer-based films are typically not bonded to the substrate well enough to be sufficiently durable for most application requirements. Powder-based coatings also exhibit weak durability. Sol-gel based coatings can offer better bonding; however, they generally exhibit poor hydrophobic qualities. Coatings based on nanoarrays have similar problems to polymer or sol-gel based films. Furthermore, fabrication of these nanostructure assemblies involves elaborate processing schemes that render them unsuitable for large-scale development and production.

There is a need in the art for scalable, impact-resistant, transparent coatings that have both dewetting and anti-icing properties. Such coatings preferably utilize low-cost, lightweight, and environmentally benign materials that can be rapidly (minutes or hours, not days) sprayed or cast in thin layers over large areas using convenient coating processes. These coatings should be able to survive environments during use over extended periods.

SUMMARY OF THE INVENTION

The present invention addresses the aforementioned needs in the art, as will now be summarized and then further described in detail below.

In some variations, the invention provides a transparent anti-icing coating comprising:

(a) a substantially continuous matrix comprising a hardened material;

(b) asymmetric templates, dispersed within the matrix, that inhibit wetting of water, wherein the asymmetric templates have a length scale from about 10 nanometers to about 300 nanometers;

(c) porous voids surrounding at least a portion of the asymmetric templates, wherein the porous voids have a length scale from about 15 nanometers to about 500 nanometers; and (d) nanoparticles, dispersed within the matrix, that inhibit heterogeneous nucleation of water, wherein the nanoparticles have an average size from about 5 nanometers to about 50 nanometers, wherein the coating may be characterized by a coating transparency of at least 70% light transmission at one or more wavelengths in the range of 400 nm to 900 nm.

In some embodiments, the coating transparency is at least 80% or at least 90% light transmission at one or more wavelengths in the range of 400 nm to 900 nm. In some embodiments, the coating transparency is at least 80% or at least 90% light transmission at all wavelengths in the range of 400 nm to 900 nm.

In some embodiments, the asymmetric templates have a length scale from about 10 nanometers to about 100 nanometers. The asymmetric templates have an aspect ratio that is higher than 1.0, preferably about 1.5 or higher.

The porous voids may have a length scale from about 20 nanometers to about 300 nanometers. Generally, the porous voids will be larger when the asymmetric templates are larger.

In some embodiments, the nanoparticles are spherical with an average diameter from about 5 nanometers to about 50 nanometers, such as about 10 nanometers to about 30 nanometers.

In some embodiments, at least some of the nanoparticles are disposed on or adjacent to surfaces of the asymmetric templates. In certain embodiments, the nanoparticles are chemically and/or physically bonded to or associated with the asymmetric templates.

The thickness of the transparent anti-icing coating may be from about 1 micron to about 1 centimeter, such as about 5 microns to about 500 microns, for example. The coating porosity may be from about 5% to about 20%, for example. In some embodiments, the coating has a void density from about $10^8$ to about $10^{11}$ voids per $cm^3$ of coating volume.

The hardened material may include a crosslinked polymer selected from the group consisting of polyurethanes, epoxies, acrylics, phenolic resins including urea-formaldehyde resins and phenol-formaldehyde resins, urethanes, siloxanes, alkyd resins, thiolenes, and combinations thereof.

The asymmetric templates may include an inorganic material selected from the group consisting of silica, silicates, carbonates, alumina, aluminosilicates, and combinations thereof. In certain embodiments, the asymmetric templates comprise anisotropic silica particles.

Optionally, the asymmetric templates are surface-modified with a compound selected from the group consisting of fatty acids, silanes, alkyl phosphonates, alkyl phosphonic acids, alkyl carboxylates, and combinations thereof.

The nanoparticles may include a nanomaterial selected from the group consisting of silica, alumina, titania, zinc oxide, polytetrafluoroethylene, polystyrene, polyurethane, silicones, and combinations thereof.

Optionally, the nanoparticles are surface-modified with a hydrophobic material selected from the group consisting of alkylsilanes, fluoroalkylsilanes, alkyldisilazanes, and combinations thereof.

The transparent anti-icing coating, according to some embodiments, is characterized by an ice melting-point depression to at least −5° C. The transparent anti-icing coating, according to some embodiments, is characterized by a kinetic delay of water freezing of at least 5 minutes at a surface temperature of −5° C.

Other variations provide a coating precursor for a transparent anti-icing coating, the coating precursor comprising:

(a) a hardenable material capable of forming a substantially continuous matrix;

(b) asymmetric templates dispersed within the hardenable material, wherein the asymmetric templates have a length scale from about 10 nanometers to about 300 nanometers; and (c) nanoparticles dispersed within the hardenable material, wherein the nanoparticles have an average size from about 5 nanometers to about 50 nanometers.

In some embodiments, the coating precursor itself is characterized by a transparency of at least 70% light transmission at one or more wavelengths in the range of 400 nm to 900 nm. During hardening (curing), the transparency of the coating precursor may change. In the final coating, the coating transparency is preferably at least 80% or at least 90% light transmission at one or more wavelengths (or all wavelengths) in the range of 400 nm to 900 nm.

In some embodiments, the asymmetric templates have a length scale from about 10 nanometers to about 100 nanometers. The asymmetric templates have an aspect ratio that is higher than 1.0, preferably about 1.5 or higher.

In some embodiments, the coating precursor further includes porous voids surrounding at least a portion of the asymmetric templates, wherein the porous voids have a length scale from about 15 nanometers to about 500 nanometers, such as about 20 nanometers to about 300 nanometers. The porous voids will be present in the final coating, but prior to hardening the voids may not yet be formed.

In some embodiments, the nanoparticles are spherical with an average diameter from about 5 nanometers to about 50 nanometers. The nanoparticles may be chemically and/or physically bonded to or associated with the asymmetric templates.

The hardenable material may be selected from the group consisting of urethanes, epoxies, acrylics, phenolic resins including urea-formaldehyde resins and phenol-formaldehyde resins, siloxanes, alkyd resins, thiolenes, ethers, esters, amides, and combinations thereof.

The asymmetric templates may include an inorganic material selected from the group consisting of silica, silicates, carbonates, alumina, aluminosilicates, and combinations thereof. In certain embodiments, the asymmetric templates comprise anisotropic silica particles.

Optionally, the asymmetric templates are surface-modified with a compound selected from the group consisting of fatty acids, silanes, alkyl phosphonates, alkyl phosphonic acids, alkyl carboxylates, and combinations thereof.

The nanoparticles may include a nanomaterial selected from the group consisting of silica, alumina, titania, zinc oxide, polytetrafluoroethylene, polystyrene, polyurethane, silicones, and combinations thereof.

Optionally, the nanoparticles are surface-modified with a hydrophobic material selected from the group consisting of alkylsilanes, fluoroalkylsilanes, alkyldisilazanes, and combinations thereof.

Other variations provide a transparent anti-icing coating, the coating obtained or derived from a coating precursor comprising:

(a) a hardenable material capable of forming a substantially continuous matrix;

(b) asymmetric templates dispersed within the hardenable material, wherein the asymmetric templates have a length scale from about 10 nanometers to about 300 nanometers; and (c) nanoparticles dispersed within the hardenable material, wherein the nanoparticles have an average size from about 5 nanometers to about 50 nanometers.

The invention provides a device that is coated, at least in part, with a transparent anti-icing coating comprising:

(a) a substantially continuous matrix comprising a hardened material;

(b) asymmetric templates, dispersed within the matrix, that inhibit wetting of water, wherein the asymmetric templates have a length scale from about 10 nanometers to about 300 nanometers;

(c) porous voids surrounding at least a portion of the asymmetric templates, wherein the porous voids have a length scale from about 15 nanometers to about 500 nanometers; and (d) nanoparticles, dispersed within the matrix, that inhibit heterogeneous nucleation of water, wherein the nanoparticles have an average size from about 5 nanometers to about 50 nanometers, wherein the coating is characterized by a coating transparency of at least 70% light transmission at one or more wavelengths in the range of 400 nm to 900 nm.

DETAILED DESCRIPTION OF EMBODIMENTS OF THE INVENTION

Figure 1:
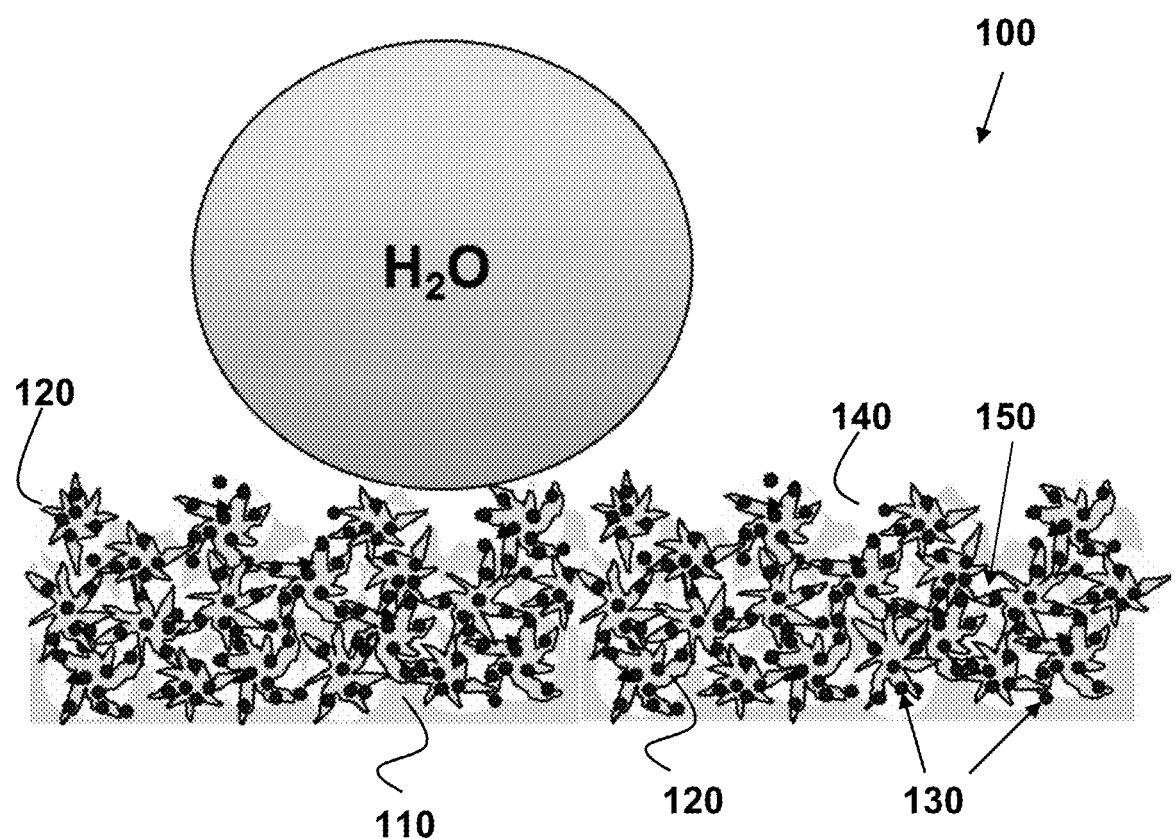
FIG. 1 is a schematic of a coating, in some embodiments of the invention (a water droplet is depicted for illustration only).

The compositions, structures, methods, and systems of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Some variations are premised on the discovery of coatings that simultaneously repel water and inhibit the formation of ice. These coatings possess a self-similar structure that utilizes a continuous matrix and, within the matrix, two feature sizes that are tuned to adjust the wetting of water and freezing of water on the surface that is coated. Unexpectedly, it has been discovered that the surface roughness and voids that drive high-contact-angle dewetting behavior may be created through judicious selection of template morphology, utilizing templates that do not need to be removed from the structure.

For water to freeze into ice, a water droplet must reach the surface and then remain on the surface for a time sufficient for ice nucleation and water solidification. The present invention can render it more difficult for water to remain on the surface, while increasing the time that would be necessary for water, if it does remain on the surface, to then form ice. The inventors have realized that by attacking the problem of surface ice formation using multiple length scales and multiple physical phenomena, particularly beneficial coatings may be fabricated.

Variations of the invention are also predicated on the discovery of coatings that can simultaneously achieve anti-icing functionality as well as transparency. In these coatings, a uniform distribution of materials throughout the coating both aids transparency, also well as presents a very similar structure on the surface after abrasion. Particle sizes are preferably smaller than the wavelength of light, to reduce or eliminate light scattering.

Transparency is the physical property of allowing light to pass through a material without being scattered. When light waves of strike an object (such as a particle in a coating), the electrons in the atoms of the object begin vibrating. If the object is transparent, then the vibrations of electrons are passed on to neighboring atoms through the bulk of the material and reemitted on the opposite side of the object. Such frequencies of light waves are said to be transmitted. If the object is opaque, then the vibrations of the electrons are not passed from atom to atom through the bulk of the material. Rather the electrons of atoms on the material's surface vibrate for short periods of time and then reemit the energy as a reflected light wave. Such frequencies of light are said to be reflected. The degree of transparency can be characterized a fraction of incoming light—having certain wavelengths, such as from 400 nm to 800 nm—that is transmitted through a given object (in this context, a coating). Transparent materials are also translucent, allowing light to pass through a material diffusely; however, translucent materials are not necessarily transparent.

It has been found, as will be further described, that asymmetric structures are particularly useful as templates within a coating material that contains a polymer and nanoparticles. The long axis of asymmetric templates provides a dimension to create sub-visible wavelength surface roughness governing wetting properties, while the short axis results in reduced light scatting compared to a spherical particle with the diameter of the largest axis. Unexpectedly, it has also been discovered that asymmetric templates help maintain the dispersion of the nanoparticles in the polymer matrix. This prevents nanoparticle agglomeration that would result in increased light scattering and loss of transparency.

The coatings provided herein, in some variations, give strong dewetting and anti-icing performance combined with the toughness and durability to survive the exterior environment associated with aircraft and automotive applications over extended periods. These coatings contain a crosslinked polymer framework for toughness and durability, porous voids and surface roughness on a length scale of tens to hundreds of nanometers to inhibit the wetting of water, a layer of nanoparticles present on the coating surface and at interfaces throughout the coatings that inhibits nucleation of ice, a uniform structure that maintains properties after abrasion, and a structure that allows light to substantially pass through the coating without absorption or scattering.

As used herein, an "anti-icing" (or equivalently, "icephobic") surface or material means that the surface or material, in the presence of liquid water or water vapor, is characterized by the ability to (i) depress the freezing point of water (normally 0° C. at atmospheric pressure) and (ii) delay the onset of freezing of water at a temperature below the freezing point.

Note that in this specification, reference may be made to water "droplets" but that the invention shall not be limited to any geometry or phase of water that may be present or contemplated. Similarly, "water" does not necessarily mean pure water. Any number or type of impurities or additives may be present in water, as referenced herein.

In some variations of the present invention, an anti-icing coating may be designed to repel water as well as inhibit the solidification of water from a liquid phase (freezing), a gas phase (deposition), and/or an aerosol (combined freezing-deposition). Preferably, anti-icing coatings are capable of both inhibiting ice formation and of inhibiting wetting of water at surfaces. However, it should be recognized that in certain applications, only one of these properties may be necessary.

In some variations, the invention provides a transparent anti-icing coating comprising:

(a) a substantially continuous matrix comprising a hardened material;

(b) asymmetric templates, dispersed within the matrix, that inhibit wetting of water, wherein the asymmetric templates have a length scale from about 10 nanometers to about 300 nanometers;

(c) porous voids surrounding at least a portion of the asymmetric templates, wherein the porous voids have a length scale from about 15 nanometers to about 500 nanometers; and (d) nanoparticles, dispersed within the matrix, that inhibit heterogeneous nucleation of water, wherein the nanoparticles have an average size from about 5 nanometers to about 50 nanometers.

The transparent anti-icing coating is preferably characterized by a coating transparency of at least 70% light transmission at one or more wavelengths in the range of 400 nm to 900 nm. In some embodiments, the coating transparency is at least 75%, at least 80%, at least 85%, at least 90%, at least 95%, or at least 99% light transmission at one or more wavelengths in the range of 400 nm to 900 nm (e.g, 589 nm). Note that these coating transparencies are measured through the entire coating thickness (e.g., 1 micron to 1 centimeter), not to a defined test depth. See Examples and FIG. 6.

In some embodiments, the coating transparency is at least 75%, at least 80%, at least 85%, at least 90%, or at least 95% light transmission at all wavelengths in the range of 400 nm to 900 nm. In some embodiments, the coating transparency is at least 75%, at least 80%, at least 85%, at least 90%, or at least 95% light transmission at all wavelengths in the range of 400 nm to 700 nm, or the range of 400 nm to 800 nm.

Coating dewetting and anti-icing performance is dictated by certain combinations of structural and compositional features within the coating. The coating may be formed using, as a continuous matrix, a durable (damage-tolerant) and tough crosslinked polymer. Within the continuous matrix, there are two types of particles characterized by two different length scales in the coating that separately control the wetting and freezing of water on the surface.

The first type of particles is an asymmetric template that promotes porosity within the continuous matrix (porous voids) as well as at the surface of the coating (surface roughness). The second type of particle is a nanoparticle that inhibits heterogeneous nucleation of ice.

As intended herein, a "void" or "porous void" is a discrete region of empty space, or space filled with air or another gas, that is enclosed within the continuous matrix. The voids may be open (e.g., interconnected voids) or closed (isolated within the continuous matrix), or a combination thereof. The voids may partially surround templates or nanoparticles. As intended herein, "surface roughness" means that the texture of a surface has vertical deviations that are similar to the porous voids, but not fully enclosed within the continuous matrix. In some embodiments, the size and shape of the selected asymmetric templates will dictate both a dimension of the porous voids as well as a roughness parameter that characterizes the surface roughness.

The asymmetric templates are three-dimensional objects. An "asymmetric template" lacks length-scale symmetry, which for purposes of this disclosure means an aspect ratio that is larger than 1.0. The aspect ratio is defined as the ratio of largest length scale to smallest length scale in the asymmetric template. In some embodiments, the asymmetric template aspect ratio is at least about 1.05, 1.1, 1.2, 1.3, 1.4, 1.5, 1.6, 1.7, 1.8, 1.9, 2.0, 2.5, or higher. Preferably, the aspect ratio is at least 1.5. In a three-dimensional object, an aspect ratio of exactly 1.0 means that all three characteristic length scales are identical, such as in a perfect cube. The aspect ratio of a perfect sphere is also 1.0. Therefore, the asymmetric templates are neither spherical nor cubicle.

Asymmetric templates may be geometrically symmetric or asymmetric. Geometrically asymmetric templates will have an aspect ratio greater than 1.0, since lack of geometrical symmetry correlates with a difference between largest and smallest length scales in the template. Randomly shaped asymmetric templates are, generally speaking, geometrically asymmetric. In some embodiments, an asymmetric template is geometrically symmetric. Examples include cylinders, cones, rectangular prisms, pyramids, or three-dimensional stars, provided that the three relevant length scales of a particular object are not all the same.

The asymmetric templates preferably have a length scale from about 10 nanometers to about 300 nanometers, such as from about 10 nanometers to about 100 nanometers. Here, "length scale" may refer to an effective diameter of a template with arbitrary shape, or an average length of template material in a given dimension. For example, the asymmetric templates may have one or more length scales that are a distance of about 5 nm, 10 nm, 15 nm, 20 nm, 25 nm, 40 nm, 50 nm, 60 nm, 75 nm, 100 nm, 125 nm, 150 nm, 175 nm, 200 nm, 250 nm, 300 nm, 325 nm, 350 nm, or 400 nm, including any distance that is intermediate to any of the recited values. In some embodiments, the maximum length scale for the asymmetric templates is a selected wavelength of light, or an average wavelength of light, for a particular application.

In preferred embodiments, the asymmetric templates are anisotropic. As meant herein, "anisotropic" templates have at least one chemical or physical property that is directionally dependent. When measured along different axes, an anisotropic template will have some variation in a measurable property. The property may be physical (e.g., geometrical) or chemical in nature, or both. The property that varies along multiple axes may simply be the presence of mass; for example, a perfect sphere would be geometrically isotropic while a three-dimensional star shape would be anisotropic. A chemically anisotropic template may vary in composition from the surface to the bulk phase, such as via a chemically modified surface. The amount of variation of a chemical or physical property, measured along different axes, may be 5%, 10%, 20%, 30%, 40%, 50%, 75%, 100% or more.

Asymmetric templates in certain embodiments have a minimum size of 10 nm; an aspect ratio higher than 1, preferably about 1.5 or higher, and more preferably about 2 of higher; and a maximum dimension of 300 nm.

In some embodiments, the asymmetric templates have an anisotropic acicular shape. "Acicular" refers to a crystal habit (external shape) characterized by a mass of slender, but rigid, needle-like crystals radiating from a central point. In some embodiments, the asymmetric templates have an anisotropic "scalenohedral" or star-shaped crystal habit. The acicular or scalenohedral asymmetric templates may have an average particle size from about 10 nm to about 300 nm with individual needle projections (or star protrusions) having an aspect ratio from about 2 to about 20, for example. In some embodiments, the asymmetric templates have an anisotropic prismatic shape with blades that are generally not as sharp as the needles in acicular shapes. Various other rhombohedra, tabular forms, prisms, or scalenohedra are also possible for anisotropic asymmetric templates, in the context of the present invention.

The asymmetric templates may be characterized as colloidal templates, discrete templates, or asymmetric inclusions, in some embodiments. The asymmetric templates are not a single, continuous framework in the coating. Rather, the asymmetric templates are non-continuous and dispersed in the continuous matrix.

The asymmetric templates themselves may possess multiple length scales. For example, the asymmetric templates may have an average overall particle size as well as another length scale associated with porosity, surface area, surface layer, sub-layer, protrusions, or other physical features.

The asymmetric templates are preferably selected so that they will not scatter light and render the coating opaque. In order to best accomplish this goal, in addition to the size limitations discussed above, variation in the index of refraction between particles should be minimized. That is, if multiple types (chemical composition or geometry) of asymmetric templates are employed, they should all have similar index of refraction. The index of refraction of the asymmetric templates may be, for example, from about 1.2 to about 1.8, such as about 1.40, about 1.45, about 1.50, about 1.55, or about 1.60.

Also, the index of refraction of the continuous matrix material should be similar to the index of refraction of the asymmetric template material. The index of refraction of the continuous matrix material may be, for example, from about 1.2 to about 1.8, such as about 1.40, about 1.45, about 1.50, about 1.55, or about 1.60. In some embodiments, the ratio of average refractive index of asymmetric templates, $n_{AT}$, to the average refractive index of continuous matrix, $n_{CM}$, is about 0.5 to about 1.5, such as $n_{AT}/n_{CM}$ of about 0.8 to about 1.2, preferably about 0.95 to about 1.05, with values that are close to $n_{AT}/n_{CM}=1.0$ being most preferred.

Preferably, the asymmetric templates are dispersed uniformly in the continuous matrix. The asymmetric templates, dispersed within the continuous matrix, create porous voids. These porous voids preferably have a length scale from about 10 nanometers to about 500 nanometers, such as from about 20 nanometers to about 300 nanometers. For example, the porous voids may have one or more length scales that are a distance of about 10 nm, 20 nm, 30 nm, 40 nm, 50 nm, 75 nm, 100 nm, 150 nm, 200 nm, 250 nm, 300 nm, 350 nm, 400 nm, 450 nm, or 500 nm, including any distance that is intermediate to any of the recited values. In some embodiments, the maximum length scale for the porous voids is a selected wavelength of light, or an average wavelength of light, for a particular application. It is noted that porous voids may be similar in size to, or even larger than, a wavelength of light, in some embodiments.

Typically, even when the asymmetric templates are all characterized by a specific geometry, the porous voids that result from the templates will be random in shape and size. Thus, the length scale of a porous void may be an effective diameter of a porous void with arbitrary shape, for example, or the minimum or maximum distance between adjacent particles, and so on.

The size of the porous voids, typically, is primarily a function of the size and shape of the asymmetric templates. This does not mean that the size of the voids is the same as the size of the asymmetric templates. The length scale of the porous void may be smaller or larger than the length scale of the asymmetric templates, depending on the nature of the templates, the packing density, and the method to produce the structure. In some embodiments, the average size of the porous voids is smaller than the average size of the asymmetric templates. For example, in certain embodiments the asymmetric templates have an average length scale of about 100 nm while the associated porous voids have an average length scale of about 50 nm.

As discussed below, the porous voids are formed during curing and/or drying. No templates or other materials need to be extracted from the coating to arrive at porous voids in the final structure, i.e. porous voids surrounding at least a portion of the asymmetric templates, wherein the porous voids have a length scale from about 15 nanometers to about 500 nanometers.

In some embodiments, the coating has an average porosity of from about 3% to about 40%, such as about 5% to about 20%, as measured by mercury intrusion or another technique. In some embodiments, the coating has an average void density of from about $10^8$ to about $10^{11}$ voids per $cm^3$ (coating volume) such as about $5 \times 10^8$, $10^9$, $10^{10}$, $10^{11}$, or $5 \times 10^{11}$ voids per $cm^3$. In some embodiments, the coating has an average density of asymmetric templates of from about 0.1 to about 0.5 $g/cm^3$, such as about 0.15, 0.2, 0.25, 0.3, 0.35, or 0.4 $g/cm^3$.

The asymmetric templates, at a surface of the continuous matrix, create surface roughness that preferably has a length scale from about 10 nanometers to about 500 nanometers, such as from about 50 nanometers to about 200 nanometers. The length scale of surface roughness may be any number of roughness parameters known in the art, such as, but not limited to, arithmetic average of absolute deviation values, root-mean squared deviation, maximum valley depth, maximum peak height, skewness, or kurtosis. For example, the surface roughness may have one or more roughness parameters of about 10 nm, 25 nm, 50 nm, 75 nm, 100 nm, 150 nm, 200 nm, 250 nm, 350 nm, 400 nm, 500 nm, including any distance that is intermediate to any of the recited values.

The length scale of surface roughness may be similar to the length scale of porous voids, arising from the fact that both the porous voids and the surface roughness result, at least in part, from the presence of the same asymmetric templates. It should also be noted, however, that the nanoparticles may contribute some degree of surface roughness, independently from the contribution by the asymmetric templates. The surface roughness caused by the nanoparticles is typically a smaller contribution, although some of the above-recited roughness parameters may be biased more heavily by the small nanoparticles.

The continuous matrix and the asymmetric templates are homogeneous on the length scale of roughness at the coating surface, in some embodiments. The coating surface preferably does not have substructures with high aspect ratios (normal to the surface) protruding out from the surface.

Nanoparticles are dispersed within the continuous matrix; in particular, nanoparticles may cover the pore walls (i.e. walls of porous voids) and surfaces of the asymmetric templates. The nanoparticles preferably have a length scale from about 5 nm to about 50 nm, such as about 10 nm to about 25 nm. Here, a nanoparticle length scale refers for example to a diameter of a sphere, a height or width of a rectangle, a height or diameter of a cylinder, a length of a cube, an effective diameter of a nanoparticle with arbitrary shape, and so on. For example, the nanoparticles may have one or more length scales that are a distance of about 2 nm, 3 nm, 4 nm, 5 nm, 6 nm, 7 nm, 8 nm, 10 nm, 15 nm, 20 nm, 25 nm, 30 nm, 35 nm, 40 nm, 45 nm, or 50 nm, including any distance that is intermediate to any of the recited values.

The asymmetric templates are preferably dispersed uniformly within the continuous matrix. The nanoparticles may be chemically and/or physically bonded to, or otherwise associated with, the asymmetric templates. Alternatively, or additionally, the nanoparticles may be dispersed uniformly within the continuous matrix but not necessarily directly associated with the asymmetric templates. Within a porous void, the nanoparticles may be deposited on pore internal surfaces. However, nanoparticles should not be continuous across entire pores, i.e. the nanoparticles should not create an interpenetrating substructure.

Without being limited to any hypotheses, it is believed that the asymmetric templates, and their associated porous voids and surface roughness, inhibit water infiltration and provide an anti-wetting surface. It is believed that the nanoparticles depress the melting point of ice, i.e. lower the temperature at which water will be able to freeze. In addition, the nanoparticles may act as emulsifiers and change the matrix-air interactions to affect how the matrix (e.g., polymer) wets around the larger asymmetric templates. The continuous matrix offers durability, impact resistance, and abrasion resistance to the coating. There is homogeneity through the z-direction of the film, so that if some portion of the coating is lost (despite the resistance to abrasion), the remainder retains the ability to inhibit wetting and freezing of water.

Due to the multiple length scales and hierarchical structure that produces strong dewetting performance, the continuous matrix material and asymmetric templates do not necessarily need to be strongly hydrophobic. The porosity in the coating magnifies the hydrophobicity based on the Cassie-Baxter equation shown below. The nanoparticles need only be somewhat hydrophobic. This is in contrast to what is taught in the art—namely, that coating components should possess high inherent hydrophobicity. As further explained below, any individual component of the coating may have a hydrophilic character, as long as the total coating is hydrophobic ($\theta_{solid}$>) 90°.

Furthermore, the coating morphology in embodiments of this invention avoids single layers of high-aspect-ratio protrusions from the outer surface. Such protrusions, which are typically made from inorganic oxides, can be easily abraded by surface contact and can render the coating non-durable. In embodiments herein, the absence of such protrusions, along with the presence of a durable continuous matrix (e.g., a tough polymeric framework), gives the final coating good resistance to abrasion and impact.

In some embodiments, the coating offers a repeating, self-similar structure that allows the coating to be abraded during use while retaining anti-wetting and anti-icing properties. Should the surface be modified due to environmental events or influences, the self-similar nature of the coating allows the freshly exposed surface to present a coating identical to that which was removed.

The anti-wetting feature of the coating is created, at least in part, by surface roughness that increases the effective contact angle of water with the substrate as described in the Cassie-Baxter equation:

$$\cos \theta_{eff} = \phi_{solid}(\cos \theta_{solid}+1)-1$$

where $\theta_{eff}$ is the effective contact angle of water, $\phi_{solid}$ is the area fraction of solid material when looking down on the surface, and $\theta_{solid}$ is the contact angle of water on a hypothetical non-porous flat surface formed from the materials in the coating. A water-air interface at the droplet surface is assumed, giving rise to the extreme contact angle of 180° associated with air (cos 180°=−1). A hydrophilic surface results when $\theta_{\it eff}$<90°, whereas a hydrophobic surface results when $\theta_{\it eff}$>90°.

By choosing a hydrophobic material for the coating (large $\theta_{solid}$) and a high porosity (small $\phi_{solid}$), the effective contact angle $\theta_{\it eff}$ will be maximized. Increasing the concentration of porous voids at the surface increases the contact angle $\theta_{\it eff}$. It should be noted that $\theta_{solid}$ is the effective contact angle of the composite materials which include the asymmetric templates, nanoparticles, and continuous matrix. As a result, any individual component of the coating may have a hydrophilic character, as long as the total coating is hydrophobic ($\theta_{solid}$>90°).

Minimization of $\phi_{solid}$ and maximization of $\theta_{solid}$ act to reduce the liquid-substrate contact area per droplet, reducing the adhesion forces holding a droplet to the surface. As a result, water droplets impacting the surface can bounce off cleanly. This property not only clears the surface of water but helps prevents the accumulation of ice in freezing conditions (including ice that may have formed homogeneously, independently from the surface). It also reduces the contact area between ice and the surface to ease removal.

In various embodiments, the effective contact angle of water $\theta_{\it eff}$ in the presence of a coating provided herein is at least 90°, such as at least 100°, 105°, 110°, 115°, 120°, or higher.

The anti-icing feature of the coating is created, at least in part, by increasing the effective contact angle of water as described above. The anti-icing feature of the coating is also created, at least in part, from the incorporation of nanoparticles within the continuous matrix and, in particular, at the surface of the coating. As described above, nanoparticles typically in the size range of about 5-50 nm may inhibit the nucleation of ice.

In some embodiments, moderately hydrophobic or highly hydrophobic nanoparticles reduce the melting temperature of ice (which equals the freezing temperature of water) at least some amount lower than 0° C., and as low as about −40° C. This phenomenon is known as melting-point depression (or equivalently, freezing-point depression). In various embodiments, nanoparticles reduce the melting temperature of ice at least down to −5° C., such as about −6° C., −7° C., −8° C., −9° C., −10° C., or lower.

Highly textured surfaces with low liquid-substrate contact areas will slow the onset of freezing of droplets on a surface by reducing conductive heat transfer to freezing substrates. The transport of heat by conduction is reduced (slower) when there are gaps between the water droplet and the solid substrate. Also, highly textured surfaces with low liquid-substrate contact areas will reduce the rate of heterogeneous nucleation due to fewer nucleation sites. The kinetics of heterogeneous ice formation will be slowed when there are fewer nucleation sites present.

The delay of the onset of droplet freezing, or the "kinetic delay of freezing," may be measured as the time required for a water droplet to freeze, at a given test temperature. The test temperature should be lower than 0° C., such as −5° C., −10° C., or another temperature of interest, such as for a certain application of the coating. Even an uncoated substrate will generally have some kinetic delay of freezing. The coating provided herein is characterized by a longer kinetic delay of freezing than that associated with the same substrate, in uncoated form, at the same environmental conditions. This phenomenon is also the source of melting-point depression.

In various embodiments, the kinetic delay of freezing measured at a surface temperature of about −5° C. is at least about 1 minute, 2 minutes, 3 minutes, 4 minutes, 5 minutes, 6 minutes, 7 minutes, 8 minutes, 9 minutes, 10 minutes, 12 minutes, 15 minutes, or more. In some embodiments, the kinetic delay of freezing is about 1 minute, 2 minutes, 4 minutes, 6 minutes, 8 minutes, 10 minutes, or more when the coating is present, compared to an uncoated substrate, measured at about −5° C.

The melting-point depression and kinetic delay of freezing allow a greater chance of the liquid water to be cleared from the surface before ice formation takes place. This is especially efficacious in view of the low adhesion and anti-wetting properties (large effective contact angle) of preferred coatings. The problem of ice formation on surfaces has essentially been attacked using multiple length scales and multiple physical phenomena, while also maintaining a transparent coating.

A schematic of a coating 100, in some embodiments, is shown in FIG. 1. An exemplary water droplet is depicted in FIG. 1, with the understanding that a water droplet is of course not necessarily present. The coating 100 includes a continuous matrix 110, asymmetric templates 120, and nanoparticles 130. The coating 100 is further characterized by surface roughness 140 and internal porous voids 150.

The "continuous matrix" 110 (or equivalently, "substantially continuous matrix" 110) in the coating means that the matrix material is present in a form that includes chemical bonds among molecules of the matrix material. An example of such chemical bonds is crosslinking bonds between polymer chains. In a substantially continuous matrix 110, there may be present various defects, cracks, broken bonds, impurities, additives, and so on.

In some embodiments, the continuous matrix 110 comprises a crosslinked polymer. In some embodiments, the continuous matrix 110 comprises a matrix material selected from the group consisting of urethanes/polyurethanes, epoxies, acrylics, urea-formaldehyde resins, phenol-formaldehyde resins, siloxanes, ethers, esters, amides, thiolenes, alkyd resins, and combinations thereof. In some embodiments, the matrix material is hydrophobic; however, the continuous matrix 110 does not require a hydrophobic matrix material.

In some embodiments, the continuous matrix 110 includes chemical bonds formed typically radical-addition reaction mechanisms with groups such as (but not limited to) acrylates, methacrylates, thiols, ethylenically unsaturated species, epoxides, or mixtures thereof. Crosslinking bonds may also be formed via reactive pairs including isocyanate/amine, isocyanate/alcohol, and epoxide/amine. Another mechanism of crosslinking may involve the addition of silyl hydrides with ethylenically unsaturated species. In addition, crosslinking bonds may be formed through condensation processes involving silyl ethers and water along with phenolic precursors and formaldehyde and/or urea and formaldehyde.

Optionally, the continuous matrix 110 may further comprise one or more additives selected from the group consisting of fillers, colorants, UV absorbers, defoamers, plasticizers, viscosity modifiers, density modifiers, catalysts, and scavengers.

The asymmetric templates 120 may comprise an inorganic material. For example, the inorganic material may be selected from the group consisting of silica, silicates, carbonates (such as calcium carbonate), alumina, aluminosilicates, and combinations thereof. The asymmetric templates 120 may be surface-modified with a compound selected from the group consisting of fatty acids, silanes, alkyl phosphonates, alkyl phosphonic acids, alkyl carboxylates, and combinations thereof.

In certain embodiments, the asymmetric templates 120 comprise calcium carbonate ($CaCO_3$) particles. The calcium carbonate may be treated or sized in various ways. For example, the calcium carbonate may be modified with a fatty acid (e.g., sodium stearate) to increase hydrophobicity. The calcium carbonate may be obtained or prepared from solution, and may be milled to reduce particle size. In certain preferred embodiments, the calcium carbonate includes at least 25 wt %, at least 50 wt %, at least 75 wt %, or at least 95 wt % anisotropic calcium carbonate particles, including essentially all of the calcium carbonate being present in anisotropic form (e.g., scalenohedral or acicular).

In some embodiments, the nanoparticles 130 comprise a nanomaterial selected from the group consisting of silica, alumina, titania, zinc oxide, polytetrafluoroethylene, polystyrene, polyurethane, silicones, and combinations thereof. In certain embodiments, the nanoparticles 130 comprise silica. Other nanoparticles 130 are possible, as will be appreciated. Optionally, the nanoparticles 130 may be surface-modified with a hydrophobic material, such as (but not limited to) silanes including an alkylsilane, a fluoroalkylsilane, and/or an alkyldisilazane (e.g., hexamethyldisilazane) as well as poly(dimethylsiloxane).

A wide range of concentrations of components may be present in the coating. For example, the continuous matrix may be from about 5 wt % to about 95 wt %, such as from about 10 wt % to about 40 wt % of the coating. The asymmetric templates may be from about 1 wt % to about 90 wt %, such as from about 50 wt % to about 80 wt % of the coating. The nanoparticles may be from about 0.1 wt % to about 25 wt %, such as from about 1 wt % to about 10 wt % of the coating.

In certain embodiments, the coating includes about 5 wt % to 80 wt % asymmetric templates and about 0.5 wt % to 10 wt % nanoparticles in about 15 wt % to about 90 wt % of a continuous matrix, such as about 50-70 wt % asymmetric templates and about 4-8 wt % nanoparticles in about 15-25 wt % of a continuous matrix.

Any known methods to fabricate these coatings may be employed. Notably, these coatings may utilize synthesis methods that enable simultaneous deposition of components to reduce fabrication cost and time. In particular, these coatings may be formed by a one-step process, in some embodiments. In other embodiments, these coatings may be formed by a multiple-step process.

In some embodiments, a coating precursor is prepared and then dispensed (deposited) over an area of interest. Any known methods to deposit coating precursors may be employed. The fluid nature of the coating precursor allows for convenient dispensing using spray coating or casting techniques over a large area, such as the scale of a vehicle or aircraft.

Some variations provide a coating precursor for a transparent anti-icing coating, the coating precursor comprising:

(a) a hardenable material capable of forming a substantially continuous matrix;

(b) asymmetric templates dispersed within the hardenable material, wherein the asymmetric templates have a length scale from about 10 nanometers to about 300 nanometers; and (c) nanoparticles dispersed within the hardenable material, wherein the nanoparticles have an average size from about 5 nanometers to about 50 nanometers.

In some embodiments, the coating precursor itself is characterized by a transparency of at least 70% light transmission at one or more wavelengths in the range of 400 nm to 900 nm. During hardening (curing), the transparency of the coating precursor may change. In the final coating, the coating transparency is preferably at least 80% or at least 90% light transmission at one or more wavelengths (or all wavelengths) in the range of 400 nm to 900 nm.

The hardenable material may be any organic oligomeric or polymeric mixture that is capable of being hardened or cured (crosslinked). The hardenable material may be dissolved in a solvent to form a solution, or suspended in a carrier fluid to form a suspension, or both of these. The hardenable material may include low-molecular-weight components with reactive groups that subsequently react (using heat, radiation, catalysts, initiators, or any combination thereof) to form a continuous three-dimensional network as the continuous matrix. This network may include crosslinked chemicals (e.g. polymers), or other hardened material (e.g., precipitated compounds).

Asymmetric templates and nanoparticles are dispersed with the hardenable material. The asymmetric templates and nanoparticles are preferably not dissolved in the hardenable material, i.e., they should remain as asymmetric components in the final coating. In some embodiments, the asymmetric templates and/or nanoparticles may dissolve into the hardenable material phase but then precipitate back out of the material as it is curing, so that in the final coating, the asymmetric templates and/or nanoparticles are distinct (e.g., as in FIG. 1).

Thus in some embodiments, a process for fabricating a coating includes preparing a hardenable material, introducing asymmetric templates and nanoparticles into the hardenable material to form a fluid mixture (solution or suspension), applying the fluid mixture to a selected surface, and allowing the fluid mixture to cure to form a solid. This process is optionally repeated to form multiple coating layers. The hardenable material is essentially the precursor to the continuous matrix; that is, the hardened or cured form of the hardenable material is the continuous matrix of the coating. The porous voids and surface roughness in the coating may form as part of the curing or hardening process.

In some embodiments, the hardenable material is a crosslinkable polymer selected from the group consisting of urethanes, epoxies, acrylics, phenolic resins including urea-formaldehyde resins and phenol-formaldehyde resins, siloxanes, alkyd resins, thiolenes, ethers, esters, amides, and combinations thereof. The hardenable material may be combined with one or more additives selected from the group consisting of fillers, colorants, UV absorbers, defoamers, plasticizers, viscosity modifiers, density modifiers, catalysts, and scavengers.

The fluid mixture may be applied to a surface using any coating technique, such as (but not limited to) spray coating, dip coating, doctor-blade coating, spin coating, air knife coating, curtain coating, single and multilayer slide coating, gap coating, knife-over-roll coating, metering rod (Meyer bar) coating, reverse roll coating, rotary screen coating, extrusion coating, casting, or printing. Because relatively simple coating processes may be employed, rather than lithography or vacuum-based techniques, the fluid mixture may be rapidly sprayed or cast in thin layers over large areas (such as multiple square meters).

When a solvent is present in the fluid mixture, the solvent may include one or more compounds selected from the group consisting of alcohols (such as methanol, ethanol, isopropanol, or tert-butanol), ketones (such as acetone, methyl ethyl ketone, or methyl isobutyl ketone), hydrocarbons (e.g., toluene), acetates (such as tert-butyl acetate), organic acids, and any mixtures thereof. When a solvent is present, it may be in a concentration of from about 10 wt % to about 99 wt % or higher, for example. An effective amount of solvent is an amount of solvent that dissolves at least 95% of the hardenable material present. Preferably, a solvent does not adversely impact the formation of the hardened (e.g., crosslinked) network and does not dissolve/swell the asymmetric templates or nanoparticles.

When a carrier fluid is present in the fluid mixture, the carrier fluid may include one or more compounds selected from the group consisting of water, alcohols, ketones, acetates, hydrocarbons, acids, bases, and any mixtures thereof. When a carrier fluid is present, it may be in a concentration of from about 10 wt % to about 99 wt % or higher, for example. An effective amount of carrier fluid is an amount of carrier fluid that suspends at least 95% of the hardenable material present. A carrier fluid may also be a solvent, or may be in addition to a solvent, or may be used solely to suspend but not dissolve the hardenable material. A carrier fluid may be selected to suspend the asymmetric templates and/or nanoparticles in conjunction with a solvent for dissolving the hardenable material, in some embodiments.

It is preferred to maintain good solubility (and therefore good dispersion) through the coating process, including curing and drying. This avoids precipitation and clouding/gelling reactions that can lead to an opaque final coating. It is noted, however, that porous voids are formed during curing and/or drying.

A wide range of concentrations of components may be present in the coating precursor. For example, the hardenable material may be from about 5 wt % to about 90 wt %, such as from about 10 wt % to about 40 wt % of the coating precursor on a solvent-free and carrier fluid-free basis. The asymmetric templates may be from about 1 wt % to about 90 wt %, such as from about 50 wt % to about 80 wt % of the coating precursor on a solvent-free and carrier fluid-free basis. The nanoparticles may be from about 0.1 wt % to about 25 wt %, such as from about 1 wt % to about 10 wt % of the coating precursor on a solvent-free and carrier fluid-free basis. In certain embodiments, the coating precursor includes about 70-80 wt % asymmetric templates and about 4-8 wt % nanoparticles in about 15-25 wt % of a hardenable material, such as about 74 wt % asymmetric templates and about 6 wt % nanoparticles in about 20 wt % of a hardenable material, on a solvent-free and carrier fluid-free basis. In various embodiments, the coating precursor includes about 50-90 wt % of a hardenable material, about 0.5-10 wt % nanoparticles, and about 5-50 wt % asymmetric templates.

The coating that is produced at least from hardening the coating precursor is a self-similar, multi-scale structure with good abrasion resistance. The self-similar material means that following impact or abrasion of the coating, which may remove or damage a layer, there will be more coating material that presents the same functionality. Additional layers that do not include one or more of the continuous matrix, asymmetric templates, and nanoparticles may be present. Such additional layers may be underlying base layers, additive layers, or ornamental layers (e.g., coloring layers). Preferably, any additional layers are also transparent and have a similar refractive index as the continuous matrix and asymmetric templates.

The overall thickness of the coating may be from about 1 µm to about 1 cm or more, such as about 10 µm, 20 µm, 25 µm, 30 µm, 40 µm, 50 µm, 75 µm, 100 µm, 500 µm, 1 mm, 1 cm, or 10 cm. Relatively thick coatings offer good durability and mechanical properties, such as impact resistance, while preferably being relatively lightweight. In preferred embodiments, the coating thickness is about 5 µm to about 500 µm, such as about 50 µm to about 100 µm.

In some embodiments, the thickness of the coating is from about 50 microns to about 100 microns, or about 10 microns to about 250 microns, such as about 10, 20, 30, 40, 50, 60, 70, 80, 90, 100, 150, 200, or 250 microns. Other coating thicknesses are possible as well.

EXAMPLES

Materials for Examples

ECL-G-7 BAC900 Base, Component A and PC-233 Curing Solution (urethane-based) are products of AkzoNobel. Norland Optical Adhesive 72 is an optically clear, thiolene, liquid adhesive made by Norland Products that is UV-cured or thermally cured. Polyfox PF-6520 is a hydroxyl end-terminated fluorinated polyether product of OMNOVA Solutions. Desmodur N 3300A is a polyisocyanate resin made by Bayer Materials Science. BYK-LP X 21261 is a hydrophobic colloidal silica that is used as hydrophobic nanoparticles. The asymmetric templates are based on Nissan Chemical MEK-ST-UP which are 9-15 nm wide and 40-100 nm long silica rods supplied as a 20-21 wt % solution in methyl ethyl ketone. Toluene and acetone are from Sigma Aldrich and n-octadecyldimethylchlorosilane, 70 wt % in toluene, is from Gelest.

Example 1: Hydrophobic Asymmetric Templates

Nissan Chemical MEK-ST-UP (60 g) is mixed with 8.12 g of n-octadecyldimethylchlorosilane (70 wt % in toluene). The clear yellow solution is placed in a Teflon jar under argon and heated at 65° C. for 3 days. It becomes an opaque white gel. The gel is centrifuged to remove excess solvent, the supernatant is discarded, and the precipitate is re-dissolved in toluene and becomes a light yellow, clear liquid. Then acetone is added until the solution becomes opaque and the suspension is centrifuged to remove excess solvent, the supernatant is discarded, and the precipitate is re-dissolved in toluene. The precipitation and re-dissolution is repeated two more times until the solution of silica nanorods in toluene is colorless. Finally, 1.641 g of solution is placed in a 130° C. oven to evaporate all solvent and determine the solid content of the solution, which is calculated as 14.69 wt %.

Example 2: Transparent Anti-Wetting and Anti-Icing Coating

BAC900 (0.960 g) is mixed with BYK-LP X 21261 (1.5 g) and the Example 1 hydrophobic asymmetric templates (13.61 g). This suspension is mixed for 1 hr and then 0.575 g of PC-233 is added. The suspension is mixed for ten minutes and then applied on a glass slide with a 10 mil (about 250 µm) draw down bar. The coating is allowed to dry and then cured for 4 hours in an 80° C. oven. This coating has a 1:0.5:2 polyurethane:colloidal silica:asymmetric templates dried mass ratio.

Figure 2A:
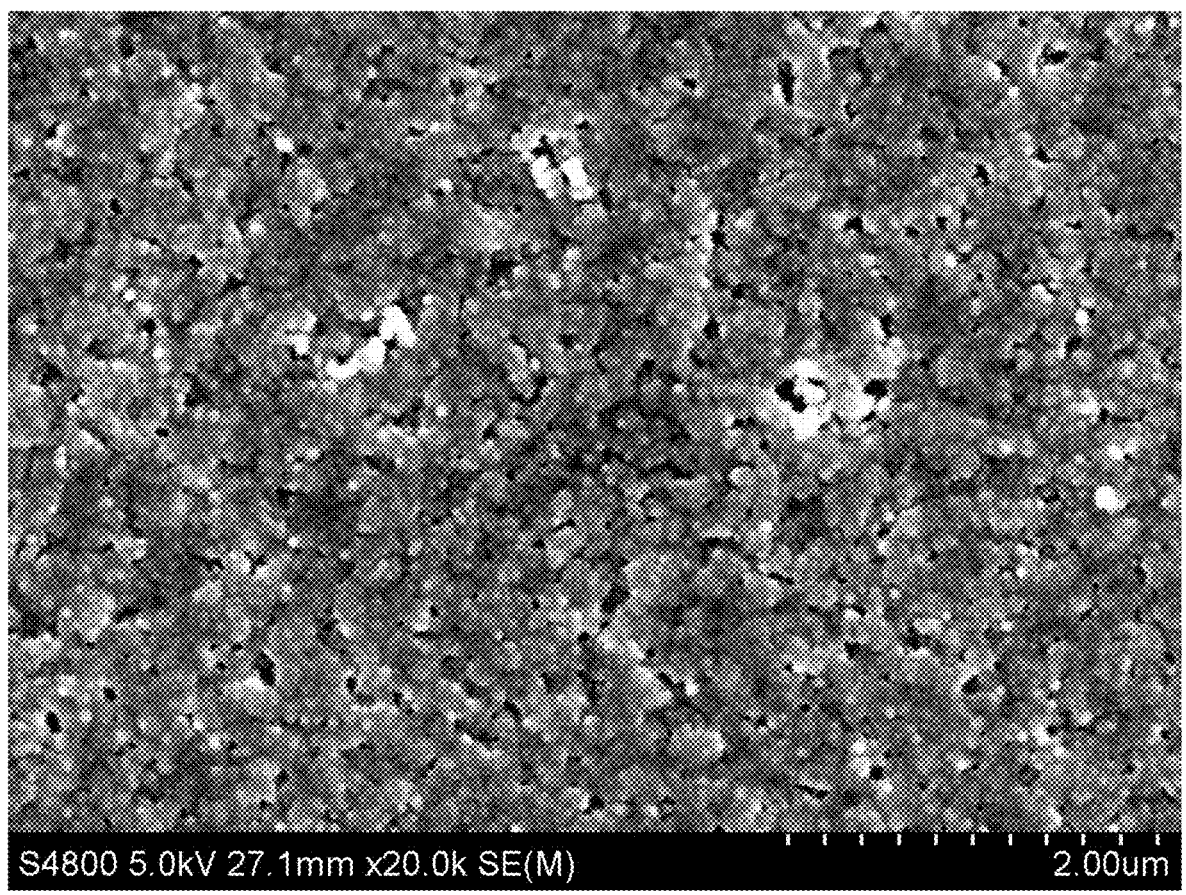
FIG. 2A is an SEM image of the top of the Example 2 coating.
Figure 2B:
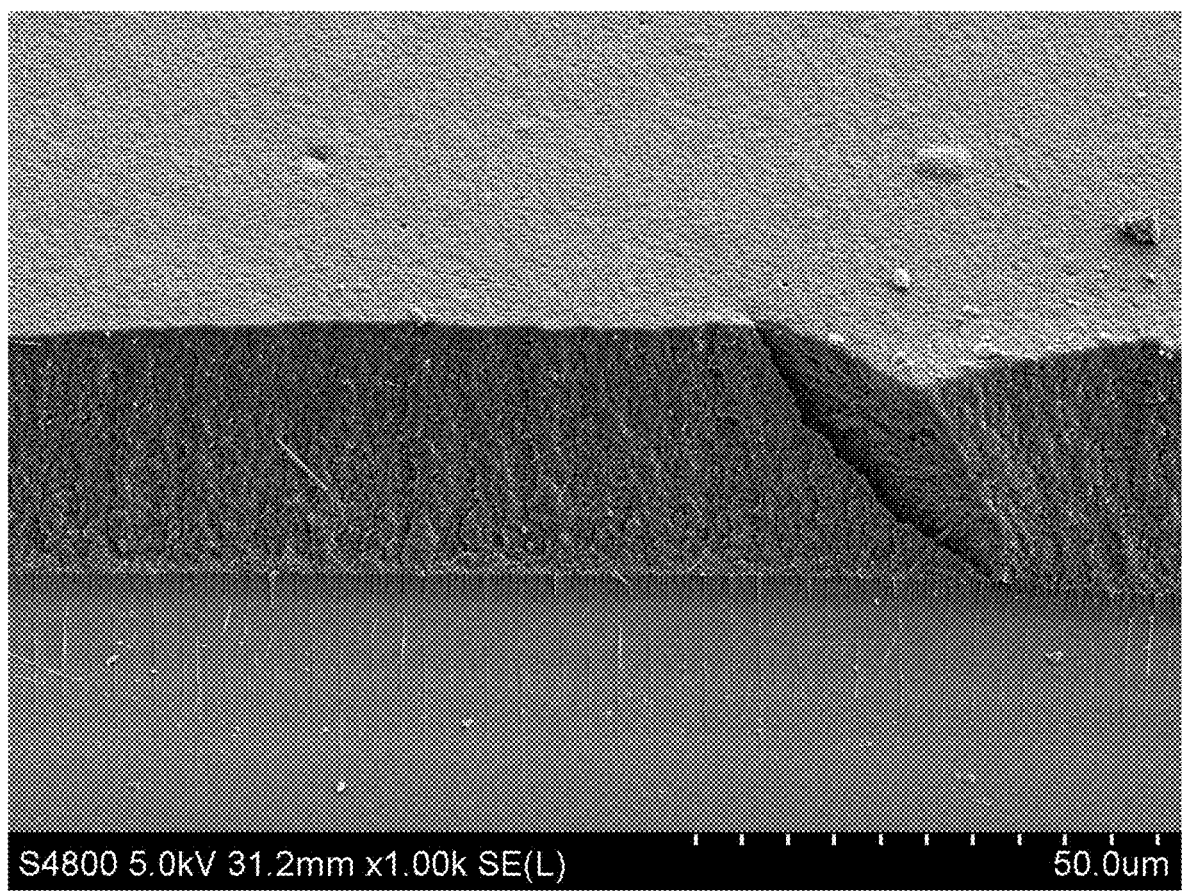
FIG. 2B is an SEM image of a cut-away view of the Example 2 coating.
Figure 6:
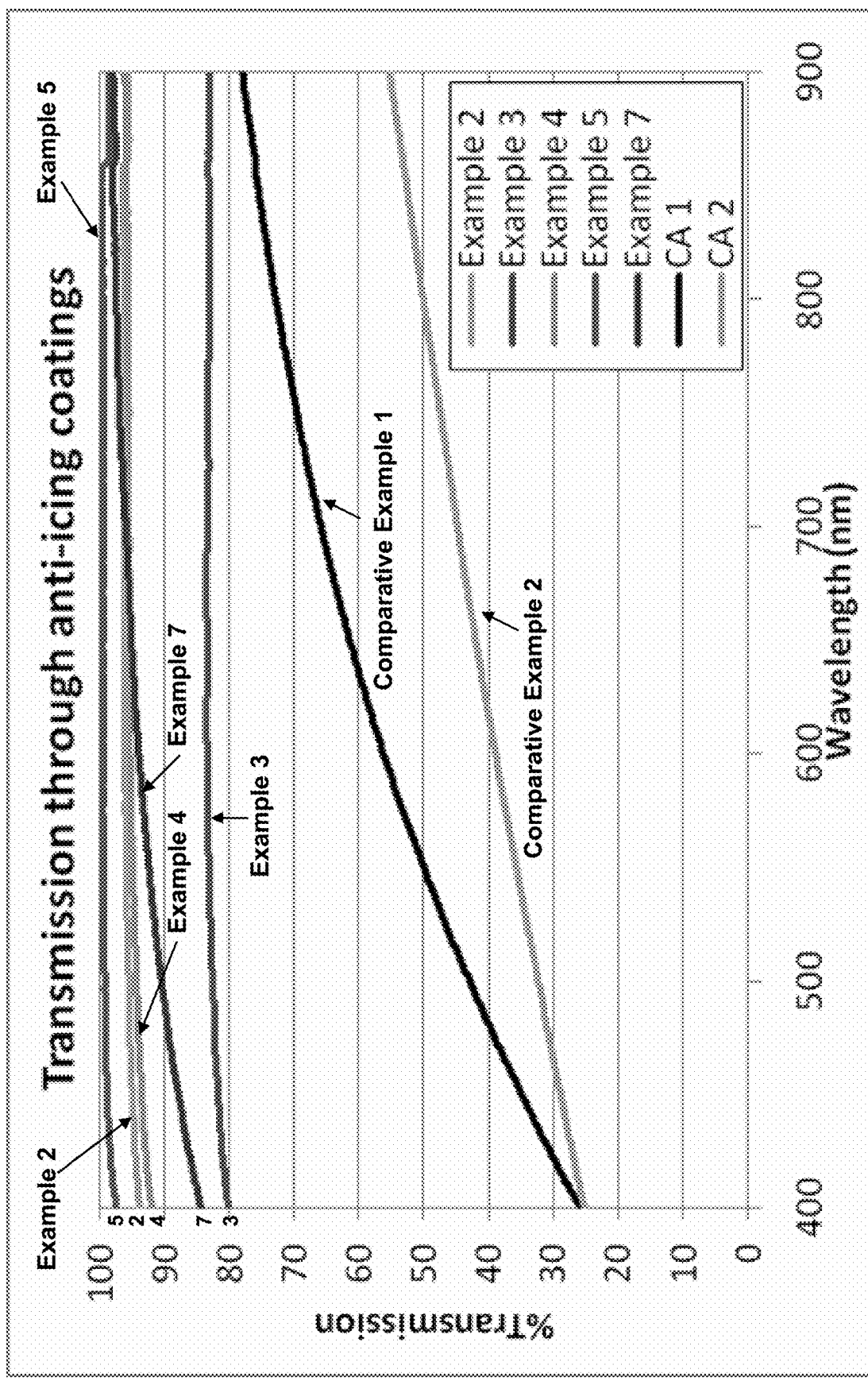
FIG. 6 is a graph of experimental light-transmission data for the coatings in Examples 2, 3, 4, 5, and 7, along with Comparative Examples 1 and 2, over a range of wavelengths from 400 nm to 900 nm.

FIG. 2A shows a SEM image of the top of this Example 2 coating, and FIG. 2B shows a cut-away view of this coating. The SEM in FIG. 2A shows roughness from asymmetric templates on the surface, and the SEM in FIG. 2B shows a uniform and dense coating. The coating is transparent as demonstrated by the light transmission data in FIG. 6, showing 96% average transmission from 400 to 900 nm.

Example 3: Transparent Anti-Wetting and Anti-Icing Coating

BAC900 (0.640 g) is mixed with BYK-LP X 21261 (1.0 g) and the Example 1 hydrophobic asymmetric templates (13.61 g). This suspension is mixed for 1 hr and then 0.383 g of PC-233 is added. The suspension is mixed for ten minutes and then applied on a glass slide with a 10 mil draw down bar. The coating is allowed to dry and then cured for 4 hours in an 80° C. oven. This coating has a 1:0.5:3 polyurethane:colloidal silica:asymmetric templates dried mass ratio.

Figure 3A:
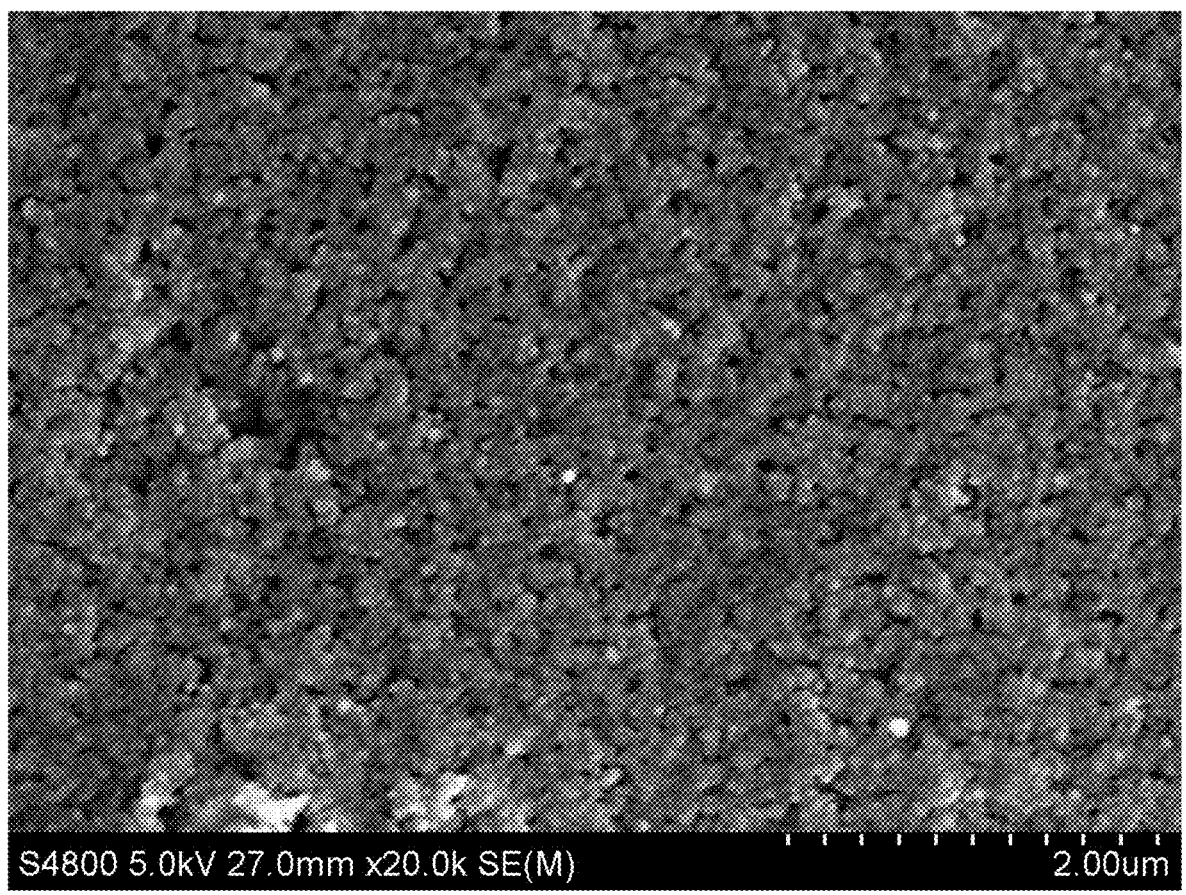
FIG. 3A is an SEM image of the top of the Example 3 coating.
Figure 3B:
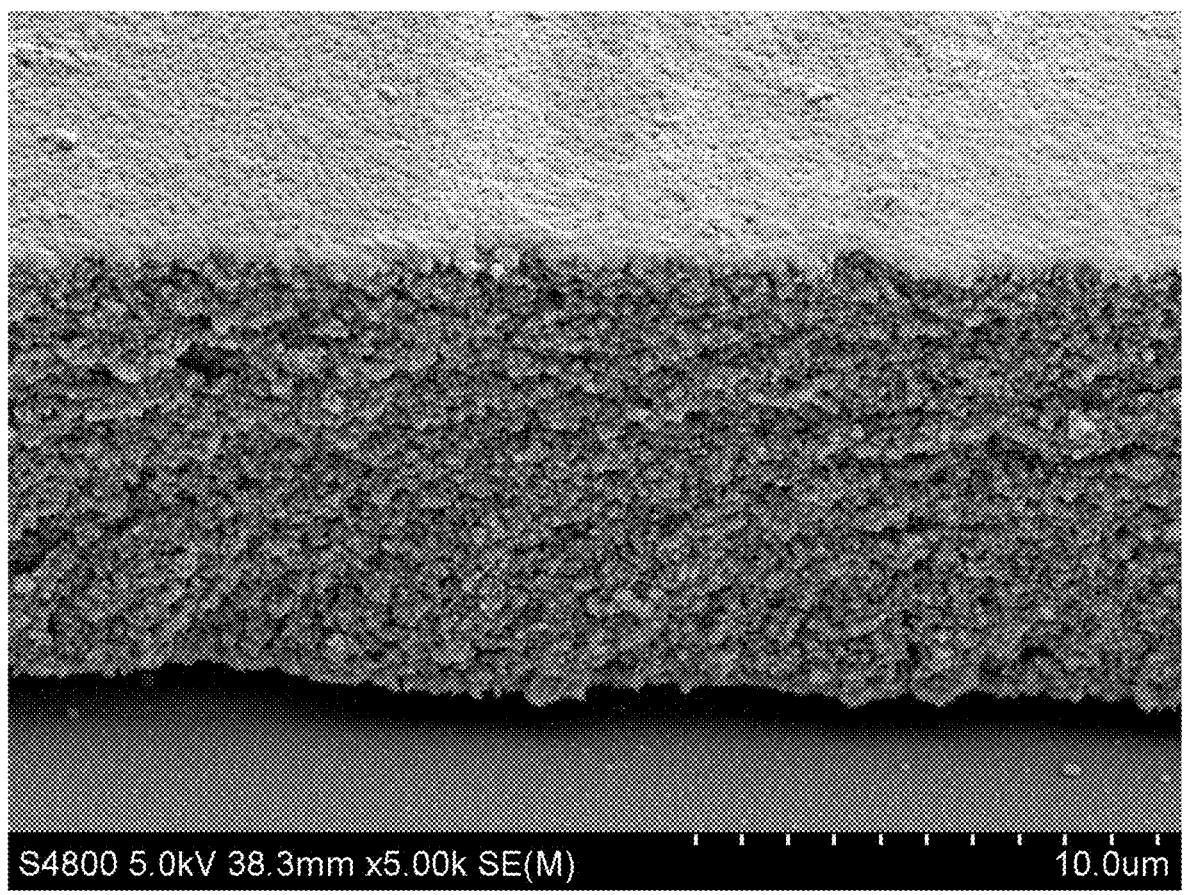
FIG. 3B is an SEM image of a cut-away view of the Example 3 coating.

FIG. 3A shows a SEM image of the top of this Example 3 coating, and FIG. 3B shows a cut-away view of this coating. FIG. 3A reveals roughness from asymmetric templates on the surface, while FIG. 3B shows a uniform coating. The Example 3 coating SEM image appears to show greater porosity (voids at surface) than the Example 2 coating. This porosity will cause light scattering that results in less light transmission through the coating. Furthermore, the coating is less dense in the cut away view as compared to Example 2, which is believed to be due to the greater amount of asymmetric templates.

The coating is generally transparent as demonstrated by the light transmission data in FIG. 6, showing 83% average light transmission from 400 to 900 nm. As indicated above, relatively high porosity causes light scattering and therefore reduced light transmission, compared to the Example 2 coating.

Example 4: Transparent Anti-Wetting and Anti-Icing Coating

BAC900 (0.960 g) is mixed with BYK-LP X 21261 (3.0 g) and the Example 1 hydrophobic asymmetric templates (13.61 g). This suspension is mixed for 1 hr and then 0.575 g of PC-233 is added. The suspension is mixed for ten minutes and then applied on a glass slide with a 10 mil draw down bar. The coating is allowed to dry and then cured for 4 hours in an 80° C. oven. This coating has a 1:1:2 polyurethane:colloidal silica:asymmetric templates dried mass ratio.

Figure 4A:
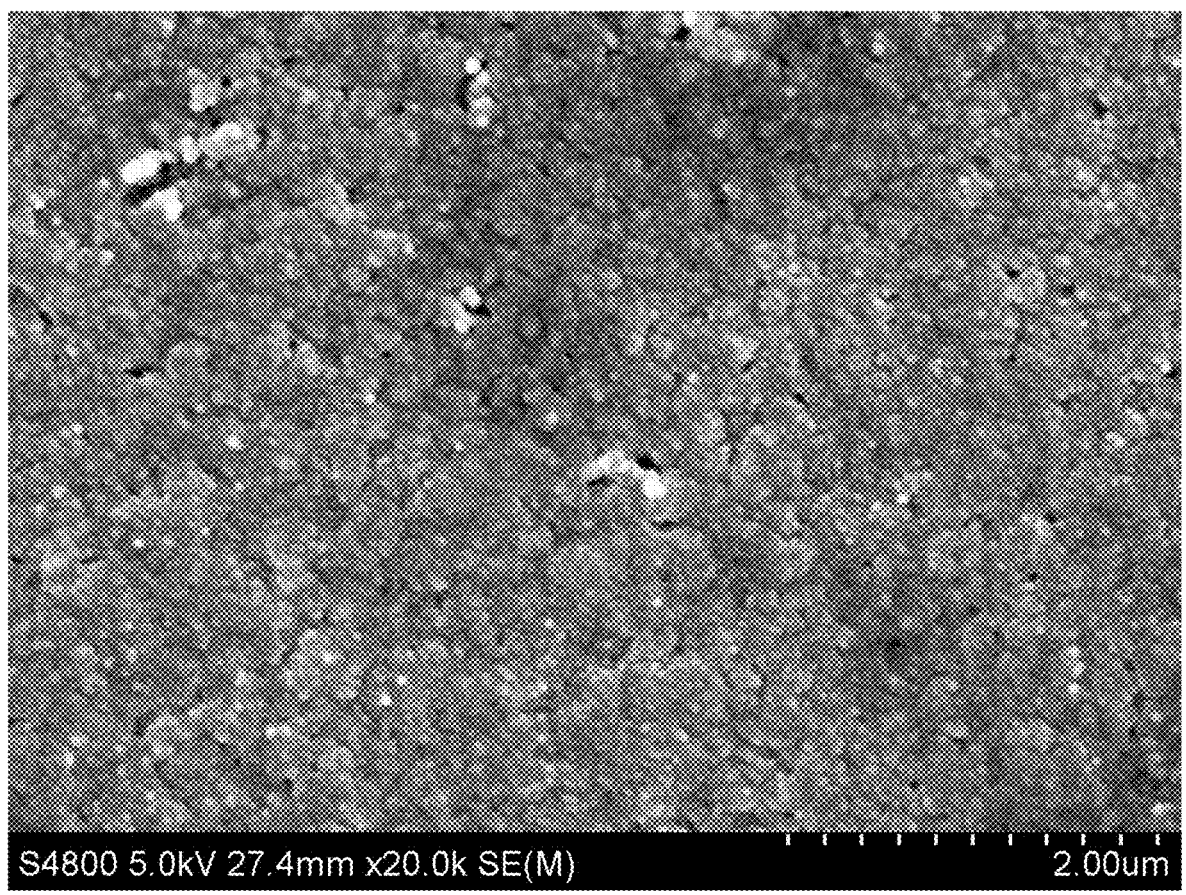
FIG. 4A is an SEM image of the top of the Example 4 coating.
Figure 4B:
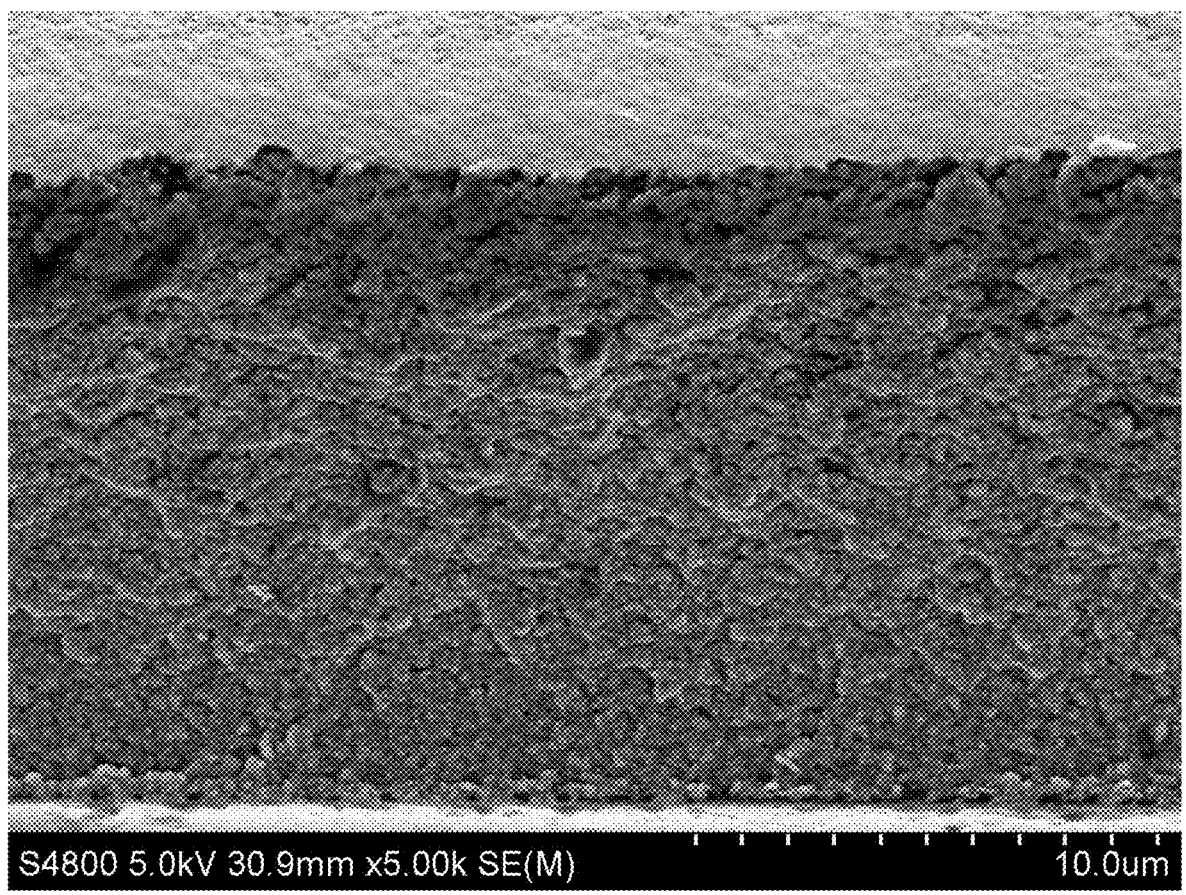
FIG. 4B is an SEM image of a cut-away view of the Example 4 coating.

FIG. 4A shows a SEM image of the top of this Example 4 coating, and FIG. 4B shows a cut-away view of this coating. FIG. 4A reveals roughness from asymmetric templates on the surface, while FIG. 4B shows a uniform and dense coating. The surface of Example 4 is less rough than the surface of Example 2, which may result from the increased amount of colloidal silica.

The coating is transparent as demonstrated by the light transmission data in FIG. 6, showing 95% average light transmission from 400 to 900 nm.

Example 5: Transparent Anti-Wetting and Anti-Icing Coating

Norland Optical Adhesive 72 (1.0 g) is mixed with BYK-LP X 21261 (1.5 g) and the Example 1 hydrophobic asymmetric templates (13.61 g). This suspension is mixed for 1 hr and then applied on a glass slide with a 10 mil draw down bar. The coating is allowed to dry and then cured with UV light. This coating has a 1:0.5:2 polymer:colloidal silica:asymmetric templates dried mass ratio.

Figure 5:
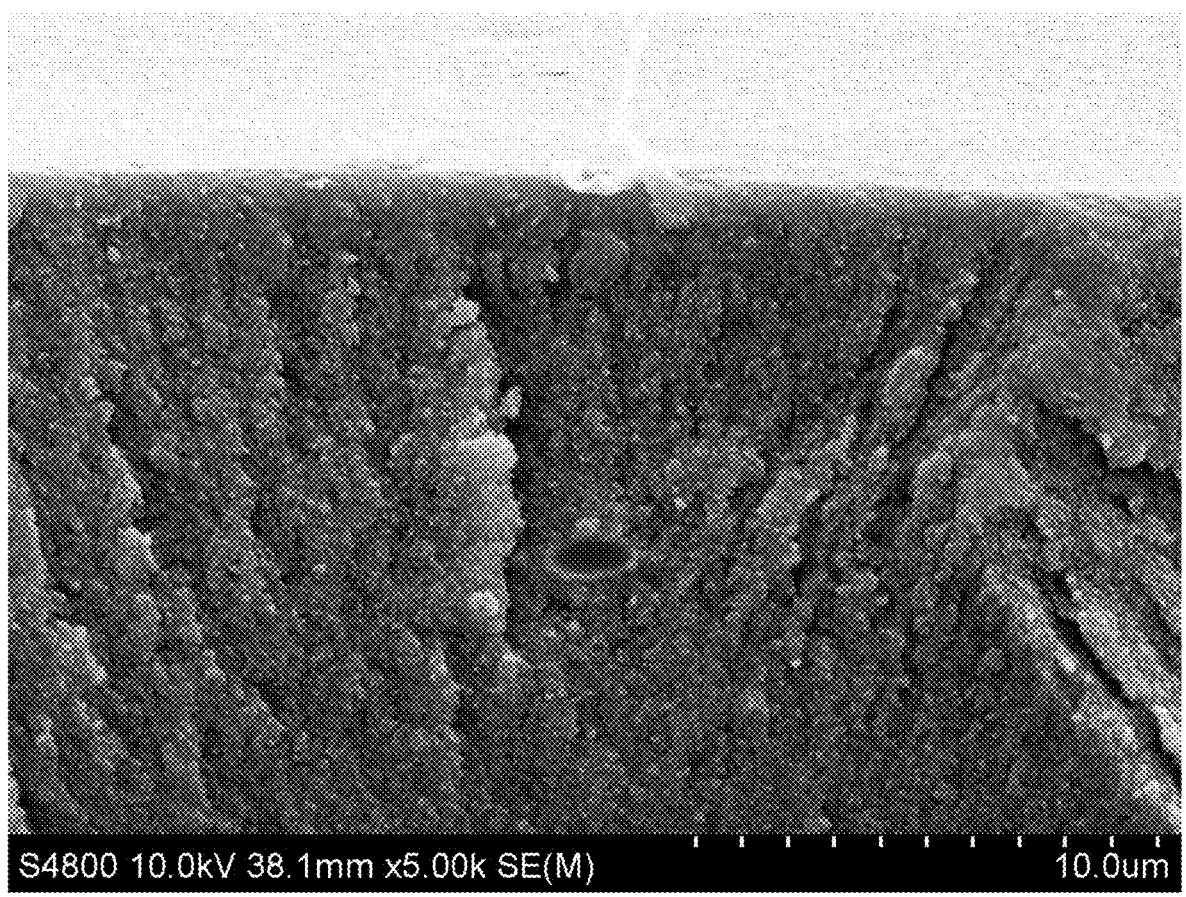
FIG. 5 is an SEM image of the Example 5 coating.

FIG. 5 shows a SEM image that shows both the top surface and a cut-away view of the Example 5 coating. The SEM image shows a dense top surface and roughness from asymmetric templates in the cut-away view.

The coating is highly transparent as demonstrated by the light transmission data in FIG. 6, showing 99% average light transmission from 400 to 900 nm.

Example 6: Fluorinated Matrix Polymer

Polyfox PF-6520 (11.65 g) is mixed with Desmodur N 3300A (1.0 g) and two 25-µL drops of dibutyltin dilaurate in a high-shear mixer. The mixture is heated at 50° C. for 15 minutes.

Example 7: Transparent Anti-Wetting and Anti-Icing Coating Made with a Fluorinated Matrix The Example 6 polymer (0.5 g) is combined with BYK-LP X 21261 (0.75 g) and the Example 1 hydrophobic asymmetric templates (6.81 g). This suspension is mixed for 10 min and then applied on a glass slide with a 10 mil draw down bar. The coating is allowed to dry and then cured for 4 hours in an 80° C. oven. This coating has a 1:0.5:2 polyurethane:colloidal silica:asymmetric templates dried mass ratio.

The coating is transparent as demonstrated by the light transmission data in FIG. 6, showing 94% average light transmission from 400 to 900 nm.

Comparative Example 1: Coating without Asymmetric Templates

BAC900 (0.960 g) is mixed with BYK-LP X 21261 (1.5 g). This suspension is mixed for 1 hr and then 0.575 g of PC-233 is added. The suspension is mixed for ten minutes and then applied on a glass slide with a 10 mil draw down bar. The coating is allowed to dry and then cured for 4 hours in an 80° C. oven. This coating has a 1:0.5:0 polyurethane:colloidal silica:asymmetric templates dried mass ratio (no asymmetric templates present).

This comparative coating is opaque, as demonstrated by the light transmission data in FIG. 6, showing 58% average light transmission from 400 to 900 nm. Also this sample exhibits greater transmission loss at smaller wavelengths due to Mie scattering of light by agglomerated nanoparticles.

Comparative Example 2: Coating without Asymmetric Templates but with Equal Total Silica Mass as Example 2

BAC900 (0.960 g) is mixed with BYK-LP X 21261 (7.5 g). This suspension is mixed for 1 hr and then 0.575 g of PC-233 is added. The suspension is mixed for ten minutes and then applied on a glass slide with a 10 mil draw down bar. The coating is allowed to dry and then cured for 4 hours in an 80° C. oven. This coating has a 1:2.5:0 polyurethane:colloidal silica:asymmetric templates dried mass ratio (no asymmetric templates present).

This comparative coating is opaque, as demonstrated by the light transmission data in FIG. 6, showing 41% average light transmission from 400 to 900 nm. Also this sample exhibits greater transmission loss at smaller wavelength due to Mie scattering of light by agglomerated nanoparticles.

As shown in the Comparative Examples 1 and 2, and in FIG. 6, a lack of asymmetric templates results in a low-transparency coating, under the conditions of these Examples.

Wetting Measurements of Coatings.

The contact angle between a water droplet and the surface was measured for all samples (Examples 2, 3, 4, 5, and 7, and Comparative Examples 1 and 2), and shown in Table 1. The base polyurethane used in Examples 2-4 and 7 as well as Comparative Examples 1 and 2 has a contact angle of 80°, as a control.

TABLE 1

Measured Contact Angles.

| Sample | Component Dry Mass Ratio* | Contact Angle |
| --- | --- | --- |
| Example 2 | 1:0.5:2 | 116° |
| Example 3 | 1:0.5:3 | 121° |
| Example 4 | 1:1:2 | 100° |
| Example 5 | 1:0.5:2 | 112° |
| Example 7 | 1:0.5:2 | 123° |
| Comp. 1 | 1:0.5:0 | 89° |
| Comp. 2 | 1:2.5:0 | 97° |
| Control** | 1:0:0 | 80° |

*Polymer:BYK colloidal silica:asymmetric templates dry mass ratio.

Examples 2-5 have high contact angles that will reduce the adhesion of water to the coating. Example 3 shows that adding additional asymmetric templates (as compared to Examples 2 and 4) results in greater surface roughness and a higher contact angle. Example 7 shows a higher contact angle than Example 2 due to the more hydrophobic fluorinated matrix polymer in the Example 7 coating. Comparative Examples 1 and 2 demonstrate that the asymmetric temples are preferred to create surface roughness for high contact angles.

Melting-Point Measurements.

The kinetic delay of freezing is measured by placing four 50-μL drops of deionized water on a coating surface held at −5° C. with a thermoelectric cooler. The time for ice to initially form in the droplets is measured and presented in Table 2.

TABLE 2

Measured kinetic delay of freezing.

| Sample | Dry Mass Ratio* | Freezing Delay** |
| --- | --- | --- |
| Example 2 | 1:0.5:2 | 724 ± 57 |
| Example 3 | 1:0.5:3 | 828 ± 7 |
| Example 4 | 1:1:2 | 638 ± 11 |
| Example 5 | 1:0.5:2 | 1067 ± 30 |
| Example 7 | 1:0.5:2 | 492 ± 59 |
| Comp. 1 | 1:0.5:0 | 715 ± 52 |
| Comp. 2 | 1:2.5:0 | 538 ± 272 |
| BAC900 + PC-233 control | 1:0:0 | 36 ± 9 |

*Polymer:BYK colloidal silica:asymmetric templates dry mass ratio.
**Freezing delay in seconds at a surface temperature of −5° C.

Longer delay times than the control polyurethane sample are found when the coatings contain silica nanoparticles to inhibit ice nucleation. Remarkably, the Example 5 coating exhibits not only the highest kinetic delay of freezing in these samples, but also the highest transparency (FIG. 6).

While Comparative Examples 1 and 2 show good ice formation delays, these coatings are not transparent, i.e. they do not have a coating transparency of at least 70% light transmission at light with wavelengths 400 nm to 900 nm.

Practical applications for the present invention include, but are not limited to, vehicle windows, optical lenses, filters, instruments, sensors, eyeglasses, cameras, satellites, weapon systems, and photovoltaic glass. For example, automotive applications can utilize these coatings to prevent the formation of ice or debris on back-up camera lenses or back-up sensors. The principles taught herein may also be applied to self-cleaning materials, anti-adhesive coatings, corrosion-free coatings, etc.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially. All publications, patents, and patent applications cited in this specification are herein incorporated by reference in their entirety as if each publication, patent, or patent application were specifically and individually put forth herein. U.S. patent application Ser. No. 13/708,642, filed Dec. 7, 2012, is also hereby incorporated by reference herein in its entirety.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A coating precursor for a transparent anti-icing coating, said coating precursor comprising:
    (a) a hardenable material capable of forming a substantially continuous matrix;
    (b) asymmetric templates dispersed within said hardenable material, wherein said asymmetric templates have a length scale from about 10 nanometers to about 300 nanometers, and wherein said asymmetric templates are hydrophobic;
    (c) porous voids surrounding at least a portion of said asymmetric templates, wherein said porous voids have a length scale from about 15 nanometers to about 500 nanometers; and
    (d) nanoparticles dispersed within said hardenable material, wherein said nanoparticles have an average size from about 5 nanometers to about 50 nanometers, wherein said nanoparticles are hydrophobic, and wherein said nanoparticles are chemically different than said asymmetric templates,
    wherein said nanoparticles are physically bonded to said asymmetric templates,
    and wherein said coating precursor is characterized by a transparency of at least 70% average light transmission at wavelengths in the range of 400 nanometers to 900 nanometers.

2. The coating precursor of claim 1, wherein said asymmetric templates have a length scale from about 10 nanometers to about 100 nanometers.

3. The coating precursor of claim 1, wherein said asymmetric templates have an aspect ratio of about 1.5 or higher.

4. The coating precursor of claim 1, wherein said porous voids have a length scale from about 20 nanometers to about 300 nanometers.

5. The coating precursor of claim 1, wherein said nanoparticles are spherical with an average diameter from about 5 nanometers to about 50 nanometers.

6. The coating precursor of claim 1, wherein said hardenable material is selected from the group consisting of urethanes, epoxies, acrylics, phenolic resins including urea-formaldehyde resins and phenol-formaldehyde resins, siloxanes, alkyd resins, thiolenes, ethers, esters, amides, and combinations thereof.

7. The coating precursor of claim 1, wherein said asymmetric templates comprise an inorganic material selected from the group consisting of silica, silicates, carbonates, alumina, aluminosilicates, and combinations thereof.

8. The coating precursor of claim 7, wherein said asymmetric templates comprise anisotropic silica particles.

9. The coating precursor of claim 1, wherein said asymmetric templates are surface-modified with a compound selected from the group consisting of fatty acids, silanes, alkyl phosphonates, alkyl phosphonic acids, alkyl carboxylates, and combinations thereof.

10. The coating precursor of claim 1, wherein said nanoparticles comprise a nanomaterial selected from the group consisting of silica, alumina, titania, zinc oxide, polytetrafluoroethylene, polystyrene, polyurethane, silicones, and combinations thereof.

11. The coating precursor of claim 1, wherein said nanoparticles are surface-modified with a hydrophobic material selected from the group consisting of alkylsilanes, fluoroalkylsilanes, alkyldisilazanes, and combinations thereof.

12. The coating precursor of claim 1, wherein the ratio of average refractive index of said asymmetric templates to the average refractive index of said continuous matrix is between about 0.5 to about 1.5.

13. The coating precursor of claim 12, wherein said ratio of said average refractive index of said asymmetric templates to said average refractive index of said continuous matrix is between about 0.8 to about 1.2.

* * * * *